3,335,145
N-CARBOXYACYL- AND N-CARBOXYAROYL-CARBOXY PIPERIDINES
Francis E. Cislak and Frank A. Karnatz, Indianapolis, Ind., assignors to Reilly Tar & Chemical Corporation, Indianapolis, Ind., a corporation of Indiana
No Drawing. Filed Jan. 25, 1965, Ser. No. 427,913
6 Claims. (Cl. 260—294)

This application is a continuation-in-part of Ser. No. 263,399, filed Mar. 7, 1963, and now abandoned.

This invention relates to new compositions of matter and to the process of making them. More particularly, it relates to N-carboxyacyl-carboxypiperidines and N-carboxyaroyl-carboxypiperidines which compounds have the formula $$\begin{array}{c} R_1 \\ R_2-S-COOH \\ N \\ | \\ O=C-A-COOH \end{array}$$

wherein $R_1$ represents hydrogen, lower alkyl group (i.e., an alkyl group of from 1 to 5 carbon atoms) or a carboxyl group, $R_2$ represents hydrogen or lower alkyl, and A represents an alkylene group (such as $-(CH_2)_n$ wherein $n$ is a whole number from 1 to 11), lower alkenylene (such as $$-CH=CH-, \quad CH_3C=CH- $$
$$CH_2=C-CH_2-)$$

or phenylene.

Our N-carboxyacyl-carboxypiperidines and our N-carboxyaroyl-carboxypiperidines are useful in the manufacture of poly-esters by interaction with polyhydric alcohols and in the manufacture of polyamides by the interaction with diamines. The reaction of our new carboxypiperidines with monohydric alcohols gives esters which are useful plasticizers. The zinc, copper, mercury, and cadmium salts of our new compounds have fungicidal properties and are useful in protection against mildew, rot, etc.

In general our N-carboxyacyl-carboxypiperidines and our N-carboxyaroyl-carboxypiperidines may be prepared by heating a piperidine carboxylic acid with a mono-ester of a dibasic acid. The equation below depicts the preparation of N-adipyl isonipecotic acid by the interaction of mono-methyl ester of adipic acid and isonipecotic acid:

$$\begin{array}{c} COOH \\ S \\ N \end{array} + MeOOC-(CH_2)_4-COOH \xrightarrow{\Delta} \begin{array}{c} COOH \\ S \\ N \\ | \\ O=C-(CH_2)_4-COOH \end{array}$$

The following specific examples illustrate the manner in which our invention may be practiced. These examples are given by the way of illustration only and are not to be construed as a limitation of our invention.

EXAMPLE 1

*N-adipyl-dinipecotic acid*

$$\begin{array}{c} HOOC-\phantom{X}-COOH \\ S \\ N \\ | \\ O=C-(CH_2)_4-COOH \end{array}$$

A mixture of 173 grams of dinipecotic acid and 160 grams of methyl ester of adipic acid is placed in a one-liter flask. The flask is connected with a condenser. The mixture is heated to a temperature of about 200° C. During the heating period, methanol is liberated. The liberated methanol is condensed and collected in a graduated cylinder. When about 40 cc. of methanol has been collected, the heating is stopped, and the reaction mixture is cooled. The N-adipyl-dinipecotic acid formed during the heating period is a semi-refined product pure enough for most uses. If, however, a purer material is desired, the semi-refined product may be purified further by extraction with ether.

The N-adipyl-dinipecotic acid is soluble in water, methanol, and ethylene glycol. It is insoluble in benzene and hexane.

Our N-adipyl-dinipecotic acid is useful in the preparation of cross-linked polyester resins.

EXAMPLE 2

*N-adipyl-isonipecotic acid*

$$\begin{array}{c} COOH \\ S \\ N \\ \| \\ O=C-(CH_2)_4-COOH \end{array}$$

A mixture of 129 grams of isonipecotic acid, 146 grams of adipic acid, and 400 cc. diethylbenzene is placed into a one-liter flask. The flask is connected to a reflux condenser and a Dean-Stark water trap. The mixture is heated under reflux conditions (about 180° C.) and the water formed by the interaction of the adipic acid and the isonipecotic acid is collected in the water trap. When about 18.0 cc. of water has been collected in the trap, the heating is stopped. The flask is allowed to cool, and the diethylbenzene remaining with the N-adipyl-isonipecotic acid, which was formed during the heating period. Any diethylbenzene remaining with the N-adipyl-isonipecotic acid is evaporated under vacuum. The hot, molten adipyl-isonipecotic acid is poured into a shallow pan and allowed to cool. The N-adipyl-isonipecotic acid is soluble in water, alcohols; it is insoluble in hydrocarbon solvents.

EXAMPLE 3

*N-glutaryl-nipectotic acid*

$$\begin{array}{c} \phantom{XX}-COOH \\ S \\ N \\ | \\ O=C-(CH_2)_3-COOH \end{array}$$

The procedure of Example 2 is repeated with the exception that 132 grams of glutaric acid is used in place of the adipic acid and 129 grams of nipecotic acid is used instead of the isonipectotic acid.

EXAMPLE 4

*N-phthalyl-isonipecotic acid*

$$\begin{array}{c} COOH \\ S \\ N \\ | \\ O=C-\phantom{X}\phantom{X} \\ \phantom{XXX}COOH \end{array}$$

To 180 grams of molten mono-methyl ester of phthalic acid in a one-liter flask there is added 129 grams of isonipecotic acid. The flask containing the resulting mixture is connected to a condenser. The mixture is gradually heated to a temperature of about 200° C. During the heating the methyl phthalate reacts with the isonipecotic acid, methanol being evolved. The methanol is condensed. When about 40 cc. of methanol is collected, the heating is stopped, and the reaction mixture is allowed to cool a bit and while the reaction product is still fluid, it is poured into a shallow pan and cooled.

EXAMPLE 5

*N-terephthalyl-isonipecotic acid*

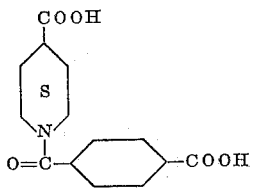

The procedure of Example 4 is followed with the exception that the mono-methyl ester of terephthalic acid is used in place of the methylphthalate.

EXAMPLE 6

*Maleic acid piperidide of isonipecotic acid*

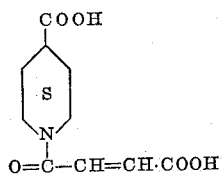

The procedure of Example 1 is repeated with the exception that 144 grams of the mono-ethyl ester of maleic acid is used in place of the methyl adipate.

EXAMPLE 7

*N-adipyl-pipecolinic acid*

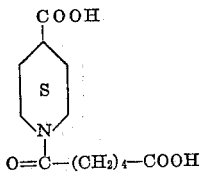

The procedure of Example 2 is repeated save that pipecolinic acid is used in place of the isonipecotic acid.

EXAMPLE 8

*N-adipyl-5-methylnipecotic acid*

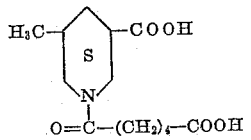

The procedure of Example 2 is repeated save that 143 grams of 5-methylnipecotic acid is used in place of the 129 grams of isonipecotic acid.

EXAMPLE 9

*N-sebacyl-isonipecotic acid*

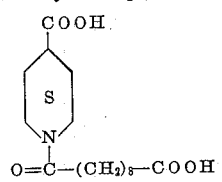

The procedure of Example 1 is repeated with the exception that 129 grams of isonipecotic acid is used in place of the dinipecotic acid and 216 grams of the methyl ester of sebacic acid is used in place of the methyl ester of adipic acid.

EXAMPLE 10

*N-brassylyl-isonipecotic acid*

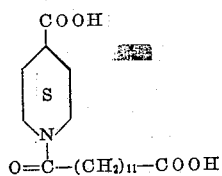

The procedure of Example 1 is repeated with the exception that 129 grams of isonipecotic acid is used in place of the dinipecotic acid and 258 grams of the methyl ester of brassylic acid is used in place of the methyl ester of adipic acid.

We claim as our invention:

1. A compound of the formula

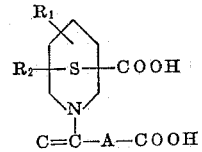

wherein $R_1$ represents a member of the class consisting of hydrogen, lower alkyl group, and carboxyl group, $R_2$ is selected from the class consisting of hydrogen and lower alkyl, and A represents a member of the class consisting of the group $—(CH_2)_n—$ wherein $n$ is a whole number from 1 to 11, lower alkenylene group, and phenylene group.

2. N-adipyl isonipecotic acid.
3. N-adipyl-nipecotic acid.
4. N-terephthalyl-isonipecotic acid.
5. N-phthalyl-isonipecotic acid.
6. N-maleic acid piperidide of isonipecotic acid.

References Cited

FOREIGN PATENTS 855,115  11/1952  Germany.

WALTER A. MODANCE, *Primary Examiner.*

A. D. SPEVACK, *Assistant Examiner.*